United States Patent
Wigren et al.

(10) Patent No.: US 10,743,214 B2
(45) Date of Patent: Aug. 11, 2020

(54) FLOW CONTROL IN WIRELESS COMMUNICATION SYSTEMS

(71) Applicant: Telefonaktiebolaget LM Ericsson (publ), Stockholm (SE)

(72) Inventors: Torbjörn Wigren, Uppsala (SE); Ramon Alejandro Delgado Pulgar, Elermore Vale (AU); Katrina Lau, Wallsend (AU); Richard Middleton, North Lambton (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/325,011

(22) PCT Filed: Jan. 19, 2017

(86) PCT No.: PCT/EP2017/051090
§ 371 (c)(1),
(2) Date: Feb. 12, 2019

(87) PCT Pub. No.: WO2018/041419
PCT Pub. Date: Mar. 8, 2018

(65) Prior Publication Data
US 2019/0230555 A1    Jul. 25, 2019

Related U.S. Application Data

(60) Provisional application No. 62/380,775, filed on Aug. 29, 2016.

(51) Int. Cl.
*H04L 12/50* (2006.01)
*H04W 28/12* (2009.01)
(Continued)

(52) U.S. Cl.
CPC ......... *H04W 28/12* (2013.01); *H04L 5/0035* (2013.01); *H04W 56/0015* (2013.01); *H04W 72/042* (2013.01)

(58) Field of Classification Search
CPC ............ H04W 28/12; H04W 56/0015; H04W 72/042; H04L 5/0035
(Continued)

(56) References Cited

U.S. PATENT DOCUMENTS

| | | |
|---|---|---|
| 2014/0301223 A1 | 10/2014 | Wong et al. |
| 2015/0063188 A1 | 3/2015 | Kanesalingam |
| 2020/0053683 A1* | 2/2020 | Gulati .............. H04W 56/0035 |

FOREIGN PATENT DOCUMENTS

| | | | |
|---|---|---|---|
| EP | 2822334 A1 * | 1/2015 | ............. H04B 17/11 |
| EP | 2822334 A1 | 1/2015 | |

(Continued)

OTHER PUBLICATIONS

Sandberg, D. et al., "Multi-rate Uplink Channel Prediction and Enhanced Link Adaptation for VoLTE", 2015 IEEE 82nd Vehicular Technology Conference (VTC2015—Fall), Sep. 6, 2015, pp. 1-5, IEEE.

*Primary Examiner* — Kwang B Yao
*Assistant Examiner* — Xuan Lu
(74) *Attorney, Agent, or Firm* — Coats & Bennett, PLLC

(57) ABSTRACT

The proposed technology generally relates to flow control in wireless communication systems and in particular to methods and devices for flow control in multi-point transmission wireless communication systems.

13 Claims, 16 Drawing Sheets

(51) Int. Cl.
  *H04W 56/00*   (2009.01)
  *H04L 5/00*    (2006.01)
  *H04W 72/04*   (2009.01)
(58) Field of Classification Search
  USPC .......................................................... 370/236
  See application file for complete search history.

(56) References Cited

FOREIGN PATENT DOCUMENTS

GB            2321829  A  *  8/1998   ............ H04J 3/0682
GB            2321829  A      8/1998
WO         2013167647 A1    11/2013
WO    WO-2013167647 A1  *  11/2013   ........ H04W 28/0247

* cited by examiner

FLOW CONTROL IN WIRELESS COMMUNICATION SYSTEMS

TECHNICAL FIELD

The proposed technology generally relates to flow control in wireless communication systems and in particular to methods and devices for flow control in multi-point transmission wireless communication systems.

BACKGROUND

Today's wireless cellular systems have been designed to handle very efficient data transfer between a single user (UE) and a single base station, denoted eNB in 4G systems. These solutions are sufficient at today's carrier frequencies close to 1-2 GHz. In future fifth generation cellular system (5G) a shift towards higher carrier frequencies is a necessity, to be able to utilize the available spectrum, thereby achieving a higher capacity overall.

A consequence of the move to higher carrier frequencies is that the radio propagation is transformed from "diffuse" scattering to beamlike propagation. This leads to sharp diffraction effects and increasingly heavy radio shadowing behind obstacles. This makes it more difficult to obtain uniform coverage from a single 5G base station (denoted eNB in case of LTE evolution and NR in case of the new access in standardization for 5G at higher carrier frequencies). The implication is a need to transmit from multiple non-co-located transmit points, to cover a single cell. Such massive multi-point transmission is generally expected to become a cornerstone in future 5G radio access.

Note also that 5G technology is based on the concept of ultra-lean transmission. This means that control channel data and system information to a very large extent is to be carried by user data, in a piggy backed fashion. For this reason continuous transmission is in some sense needed in order to keep a multi-point transmission path active.

It should be noted that multi-point transmission is also considered for the present 4G LTE system, however the need and also the massiveness of the solutions for 4G are believed to be less than those of future 5G cellular systems. The same is true for the IEEE standards of which WIFI constitute a major part.

In a massive multi-point transmission system, where data is arriving from uplink core network nodes, each involved transmit point needs to be given access to (portions of) this data, for transmission over the wireless interface. In many applications the data is closely related to data simultaneously being transmitted from other transmit points. This is e.g. the case for streaming video, in which case the data for a specific part of the video are needed at the same time (to within a certain pre-determined margin) in the receiving UE.

It should here be noted that the different transmit points may transmit different data, or the same data for diversity gain, or a mix of these alternatives.

One problem that may arise relates to synchronization of the received data in the UE. Data received by the splitter, in the best case will be an ordered set of packets that need to be transmitted to the UE. However, due to non-uniform and very varying delays in the individual flows, the packets received by the UE will in general be out of order. The delay variations that cause the out-of-ordering may be the result of:

Varying queuing delays in the eNBs,
Varying transport network delays, e.g. due to congestion and the technology used for the physical transport, and/or
Varying radio link quality, causing eNB buffer size variation.

It is stressed that the radio link variations and hence the delay variations are likely to increase in importance for higher 5G carrier frequencies, due to the increasing radio shadowing.

Small timing errors between packets received are automatically handled by the protocols applied which re-orders the packets to re-synchronize and create the correct data sequence. However, if the asynchronism is too large, the protocols will register an error, and request re-transmission of several packets. In some protocol implementations, this may cause re-transmission of out of sequence packets already received, as well as packets still in flight. This will then affect the user experience in a negative way, causing e.g. the streaming video to display erroneously.

Another problem is that the number of users and thereby data flows is expected to increase very significantly in 5G systems, as compared to present 4G systems. This means that the number of controller algorithm instances will also increase significantly. As a consequence the processing requirements need to be small, for the selected controller algorithm.

Yet another problem in 5G systems is that certain types of applications like robotic control over wireless do require a much reduced latency as compared to present 4G systems. This does require very tight flow control at bearer level, to secure the latency specification is met.

A potential problem is also that the ultra-lean transmission paradigm of 5G requires some sort of continuous transmission over all desired transmission paths, to provide signaling of the necessary control information continuously. If this is not the case, the multi-point wireless transmission path that is subject to data starvation would become inactive, due to a potential loss of critical control states, like channel state information or synchronization.

Some prior art solutions concerning delay when providing multi-point transmission are previously known, each of them having different drawbacks, see for example WO2013/167647 A1, GB 2 321 829 A and EP 2 822 334 A1.

SUMMARY

It is an object to provide multi-point transmission with improved synchronization properties.

This and other objects are met by embodiments of the proposed technology.

According to a first aspect, there is provided a method, in a primary node, for assisting in multi-point transmission control comprising obtaining of information representing downlink signaling delays between the primary node and secondary nodes. An average downlink signaling delay between the primary node and the secondary nodes is determined. A respective time skew correction value for each secondary node is determined by subtracting a respective downlink signaling delay from the average downlink signaling delay. A respective reference dwell time value for each secondary node is determined as a sum of the time skew correction value and a common delay parameter.

According to a second aspect, there is provided a method for controlling multi-point transmission comprising obtaining of information representing downlink signaling delays between the primary node and secondary nodes. An average downlink signaling delay between the primary node and the secondary nodes is determined. A respective time skew correction value for each secondary node is determined by subtracting a respective downlink signaling delay from the average downlink signaling delay. A respective reference dwell time value for each secondary node is determined as a sum of the time skew correction value and a common delay parameter. The queue dwell time for each secondary node is controlled in dependence of the reference dwell time value.

According to a third aspect, there is provided a method, in a secondary node, for assisting in multi-point transmission control comprising measuring downlink signaling delay between a primary node and the secondary nodes and transmitting information representing the downlink signaling delay to the primary node.

According to a fourth aspect, there is provided a primary node in a multi-point transmission network configured to assist in multi-point transmission control and configured to obtain information representing downlink signaling delays between the primary node and secondary nodes. The primary node is further configured to determine an average downlink signaling delay between the primary node and the secondary nodes. The primary node is further configured to determine a respective time skew correction value for each secondary node by subtracting a respective downlink signaling delay from the average downlink signaling delay. The primary node is further configured to determine a respective reference dwell time value for each secondary node as a sum of the time skew correction value and a common delay parameter.

According to a fifth aspect, there is provided a primary node in a multi-point transmission network configured to control multi-point transmission and configured to obtain information representing downlink signaling delays between the primary node and secondary nodes. The primary node is further configured to determine an average downlink signaling delay between the primary node and the secondary nodes. The primary node is further configured to determine a respective time skew correction value for each secondary node by subtracting a respective downlink signaling delay from the average downlink signaling delay. The primary node is further configured to determine a respective reference dwell time value for each secondary node as a sum of the time skew correction value and a common delay parameter. The primary node is further configured to control the queue dwell time for each secondary node in dependence of the reference dwell time value.

According to a sixth aspect, there is provided a secondary node in a multi-point transmission network configured to assisting in multi-point transmission control and configured to measure downlink signaling delay between a primary node and the secondary node. The primary node is further configured to transmit information representing the downlink signaling delay to the primary node.

According to a seventh aspect, there is provided a computer program comprising instructions, which when executed by at least one computer, cause the at least one computer to obtain information representing downlink signaling delays between the primary node and secondary nodes, to determine an average downlink signaling delay between the primary node and the secondary nodes, to determine a respective time skew correction value for each secondary node by subtracting a respective downlink signaling delay from the average downlink signaling delay, and to determine a respective reference dwell time value for each secondary node as a sum of the time skew correction value and a common delay parameter.

According to an eighth aspect, there is provided a computer program comprising instructions, which when executed by at least one computer, cause the at least one computer to obtain information representing downlink signaling delays between the primary node and secondary nodes, to determine an average downlink signaling delay between the primary node and the secondary nodes, to determine a respective time skew correction value for each secondary node by subtracting a respective downlink signaling delay from the average downlink signaling delay, to determine a respective reference dwell time value for each secondary node as a sum of the time skew correction value and a common delay parameter, and to control the queue dwell time for each secondary node in dependence of the reference dwell time value.

According to a ninth aspect, there is provided a computer program comprising instructions, which when executed by at least one computer, cause the at least one computer to measure downlink signaling delay between a primary node and the secondary node, and to transmit information representing the downlink signaling delay to the primary node.

According to a tenth aspect, there is provided a computer program product comprising a computer readable medium having stored thereon a computer program according to any of the seventh, eighth or ninth aspects.

According to an eleventh aspect, there is provided a carrier comprising the computer program of the tenth aspect.

According to a twelfth aspect, there is provided a primary node in a multi-point transmission network for assisting in multi-point transmission control comprising an obtaining module for obtaining information representing downlink signaling delays between the primary node and secondary nodes. The primary node further comprises a determining module for determining an average downlink signaling delay between the primary node and the secondary nodes. The determining module is further arranged for determining a respective time skew correction value for each secondary node by subtracting a respective downlink signaling delay from the average downlink signaling delay. The determining module is further arranged for determining a respective reference dwell time value for each secondary node as a sum of the time skew correction value and a common delay parameter.

According to a thirteenth aspect, there is provided a primary node in a multi-point transmission network for controlling multi-point transmission comprising an obtaining module for obtaining information representing downlink signaling delays between the primary node and secondary nodes The primary node further comprises a determining module for determining an average downlink signaling delay between the primary node and the secondary nodes. The determining module is further arranged for determining a respective time skew correction value for each secondary node by subtracting a respective downlink signaling delay from the average downlink signaling delay. The determining module is further arranged for determining a respective reference dwell time value for each secondary node as a sum of the time skew correction value and a common delay parameter. The primary node further comprises a controller module for controlling the queue dwell time for each secondary node in dependence of the reference dwell time value.

According to a thirteenth aspect, there is provided a secondary node in a multi-point transmission network for assisting in multi-point transmission control, wherein said secondary node comprises a measurement module for measuring downlink signaling delay between a primary node and the secondary node, and a transmitter for transmitting information representing the downlink signaling delay to the primary node.

An advantage of the proposed technology is improved multipoint flow control, in particular for 5G, by the use of interval time skew flow control. This flow control allows for enhanced capacity, as a result of the enabled multi-point transmission, by the split bearer time skew control algorithm. Another advantage of the proposed technology is low computational complexity, due to the fact that single-input-single-output controllers may be used for the time-skew control. Another advantage of the proposed technology is that there are easily tuned and robust control loops, by a minimization of the inter-node coupling. Another advantage of the proposed technology is flow control that is consistent with the 5G concept of ultra-lean transmission. The proposed technology provides a multi-point transmission with improved synchronization properties in that the delay characteristics between the various flows are improved.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of a multi-transmission system and multipoint flow control basics.

Figure 1:
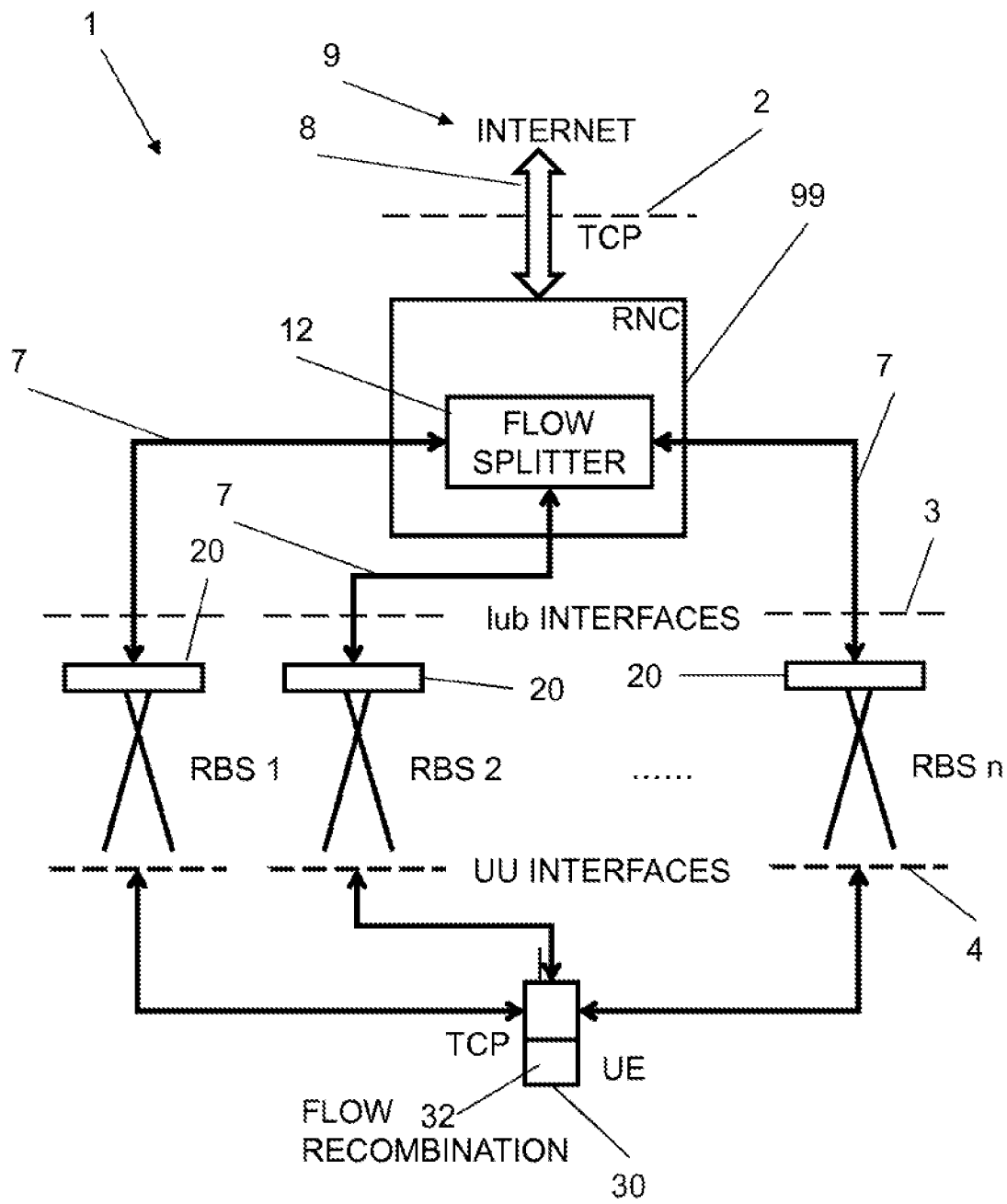
FIG. 1 is an illustration of an exemplary multipoint flow control architecture.

One mechanism for achieving multi-point transmission in prior art is illustrated in FIG. 1, comprising splitting and recombination of a single flow via multiple flows at the physical layer. That figure depicts an architecture of the existing prior art 3G WCDMA system. Similar architectures in 4G and 5G could involve nodes from both the radio access network (RAN) and the core network (CN).

As an example, data 8 from the Internet 9 is received over a Transmission Control Protocol (TCP) interface 2 by a flow splitter 12 of a Radio Network Controller (RNC) 99. This data 8 will in the best case be an ordered set of packets that need to be transmitted to a UE 30. The data 8 is split by the flow splitter 12 into a number of individual flows 7 of packets, provided to a multitude of transmit nodes or wireless-transmission points 20, typically Radio Base Stations (RBS), e.g. NodeBs, over an Iub Interface 3. The RBSs 20 transmit the packets by radio signals over UU interfaces 4 to the UE 30.

In the UE 30, a recombiner 32 performs a flow recombination. However, due to non-uniform and varying delays in the individual flows 7, the packets received by the UE 30 will in general be out of order. The delay variations that cause the out-of-ordering may be the result of:

Varying queuing delays in the RBS,

Varying transport network delays, e.g. due to congestion, and/or

Varying radio link quality, causing RBS buffer size variation.

A first task of a packet scheduler of the flow splitter 12 is to determine the amount of packets from the packet queue of the data 8 that are to be sent on at the present time, at each output of the flow splitter 12. In other words, in the packet scheduler, packets to be sent to each of a plurality of transmit nodes 20 in a subsequent sampling period are scheduled. Here, so-called rate shaping may be used, meaning that the packets are sent over a specified time interval with a selected bit rate or packet rate. A motivation for this is provided by information theory, where Shannon's famous result proves that every channel is associated with a maximum rate that allows error free data transfer.

The packet scheduler may also decide, or use external decisions, on the priority path of certain types or classes of packets. It may e.g. always schedule high priority packets via the packet path with the lowest latency to the end user. The packet scheduler may also decide, or use decisions, on diversity transmission, thereby duplicating a packet and scheduling multiple packet copies over several different flows 7. This of course increases the chances of error free reception of the information of said duplicated package, at the receiving end. Diversity transmission could also be achieved over one path, by scheduling copies of the same packets over the same path, but at different times. The chances of good channel conditions for at least one copy of said duplicated packet thereby increases, which in turn increases the probability of correct reception of the information of the duplicated package at the receiving end.

It is stressed that it is the package scheduler of the flow splitter 12 that is responsible for the transmission of packets from the, possibly virtual, node where it resides, in this particular example the RNC 99.

The basics of the automatic control terminology used in the present disclosure are explained in Appendix A. It is stressed that this terminology is part of the prior art in the field of automatic control.

Figure 6:
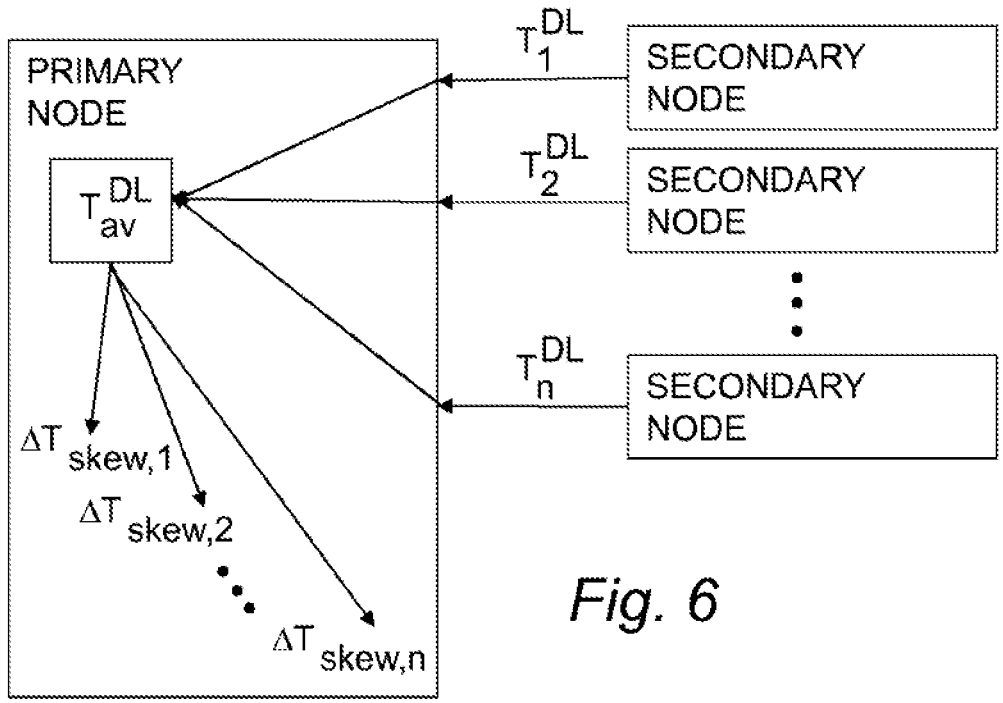
FIG. 6 is a block diagram of an embodiment of a wireless communication system utilizing multi-point transmission.

The new decentralized controller structure is here below described for the case with n transmit points, and for one bearer. The generalization to more than 1 bearer is trivial since this generalization is obtained by setting up another instance of the functionality described below. In this context, a bearer may be thought of as supporting a flow of data packets belonging to an IP connection. FIG. 6 illustrates schematically a multi-point transmission system having a primary node, also referred to as a master node, and a number n of secondary nodes, also referred to as slave nodes. In the secondary nodes, backhaul downlink delays, also referred to as downlink signaling delays, $T_i^{DL}$, i=1, . . . , n, are measured and transmitted to the primary node. The primary node obtains the downlink signaling delays by receiving the values from the secondary nodes. In the present disclosure, "signaling" refers to control signaling as well as data traffic. The primary node is further configured to determine an average downlink signal delay, $T_{av}^{DL}$, between the master node and the slave nodes. The primary node is further configured to determine time skew correction values, $\Delta T_{skew,i}$, i=1, ..., n, for each secondary node by subtracting the respective downlink signaling delay from the average downlink signaling delay. The primary node is further configured to determine a respective reference dwell time value for each secondary node. The reference dwell time value is calculated as a sum of the reference dwell time value and a common delay parameter. In a preferred embodiment, the common delay parameter is determined in dependence of an average queue dwell time.

Figure 7:
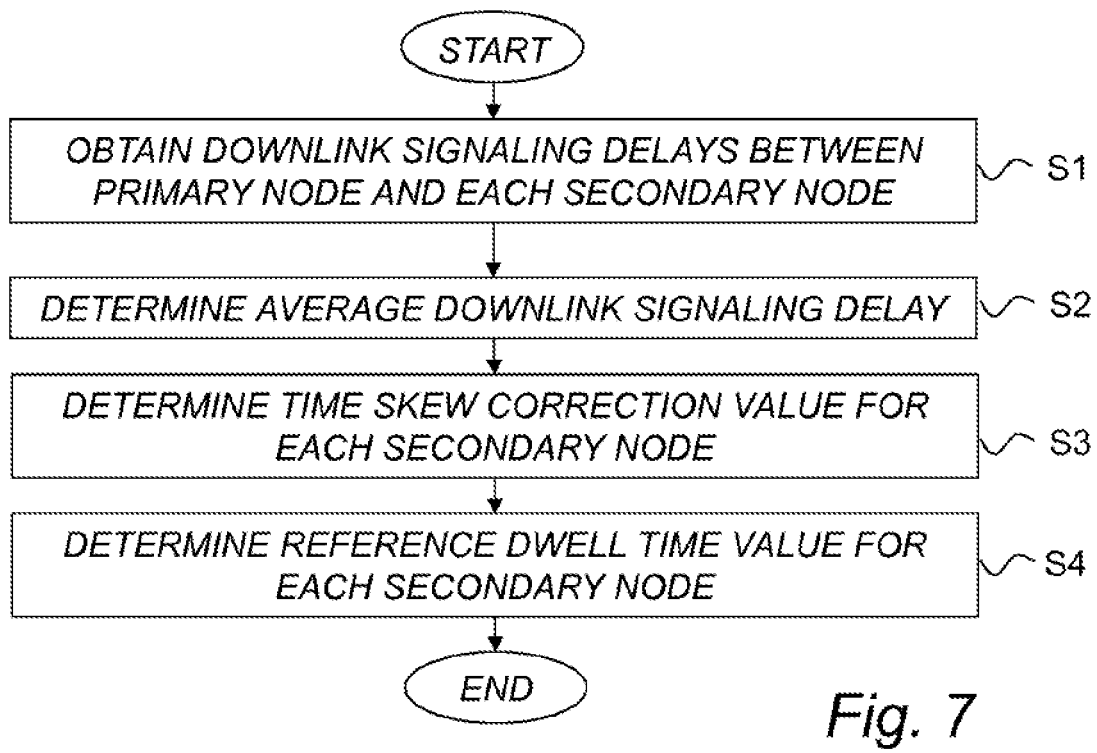

FIG. 7 is a flow diagram of steps of an embodiment of a method for assisting in multi-point transmission control implemented in a primary node. In step S1, information representing downlink signaling delays between the primary node and secondary nodes is obtained. In step S2, an average downlink signaling delay between the primary node and secondary nodes is determined. In step S3, a subtraction of a respective downlink signaling delay from the average downlink signaling delay is used to determine a respective time skew correction value for each secondary node. In step S4, a respective reference dwell time value is determined for each secondary node. The reference dwell time value is calculated as a sum of the reference dwell time value and a common delay parameter.

Note that the present invention assists in controlling the transmission time difference from multiple transmission points such as base stations. The controlling is performed by a controller in one primary node, different from the transmission nodes, and located closer to the data source in the network architecture. The control loop operates at the packet data convergence protocol (PDCP) layer, above base band layers, and it operates on user data streams. The present invention operates on data packets for a packet switched network and is not frame based, hence time skew control is independent of any frame structure.

The present invention aims at equalizing the time skew differences caused by the backhaul delay variations and the delay variation associated with the dynamically varying data contents of the transmission buffers of the secondary nodes, which in turn are affected by the wireless capacity variations.

The present invention discloses time skew transmission time control for a packet switched network, such as 4G LTE and 5G. In such systems the amount of user data allocated to a user for transmission over the air interface is not determined beforehand, instead it varies with the channel and the transmission of data of other users. Since air interface utilization requires data to be available for transmission at any time, this means that transmission buffers are needed for packet switched systems to maximize utilization when users are scheduled. The present invention provides a way to control the time the packets shall be delayed in the transmission buffers of the secondary nodes, i.e. the dwell time.

The control loop of the present invention only includes the primary node and the secondary nodes and is thus terminated at the transmission node side of the air interface, no extra messages are sent to the UE which is thus outside the control loop of the invention.

The above described steps of the method are performed regularly for example at constant intervals. The feedback information representing downlink signaling delays, and in some embodiments including queue dwell time delays, obtained from the secondary nodes is preferably periodic and transmitted from the secondary nodes. Thereby no messages have to be transmitted from the primary node to the secondary nodes in order to trigger the feedback.

Figure 8:
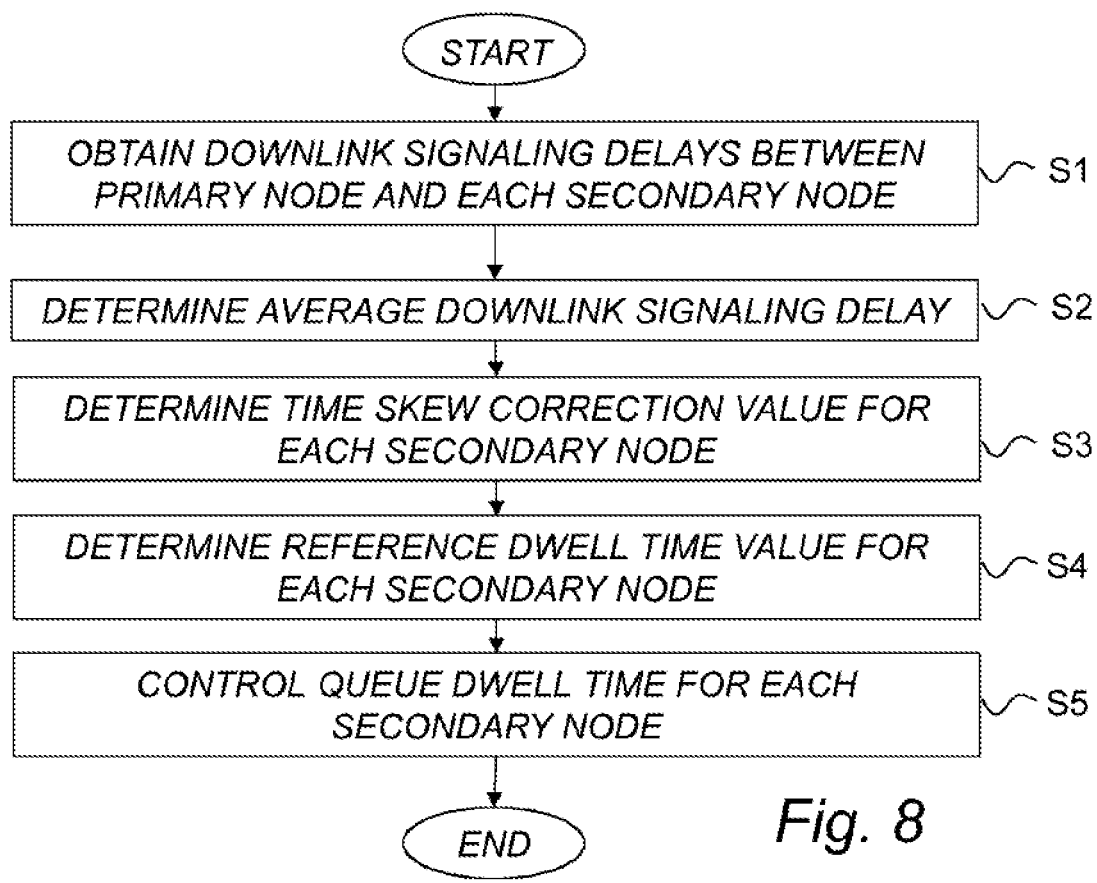

FIG. 8 is a flow diagram of steps of an embodiment of a method for performing multi-point transmission control implemented in a primary node. Steps S1-S4 are similar to the ones presented in FIG. 7. In step S5, The queue dwell time for each secondary node is controlled in dependence of the reference dwell time value.

Figure 9:
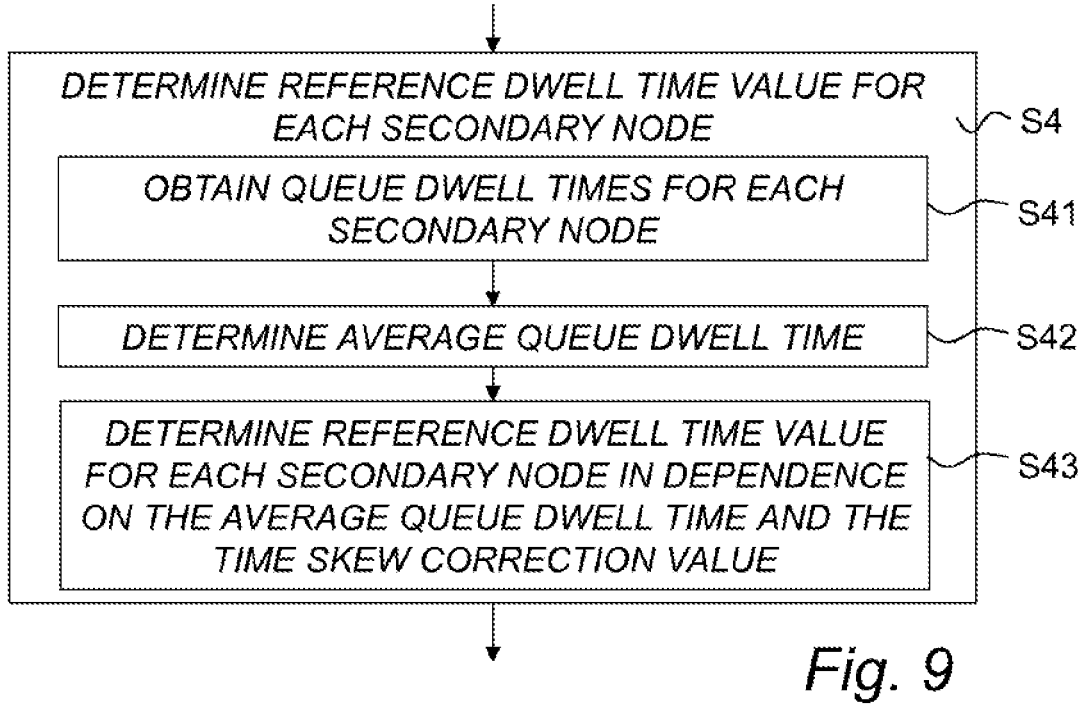

FIG. 9 is a part flow diagram of an embodiment of step S4 of FIG. 7 or 8. In step S41 information representing queue dwell times for each of the secondary nodes is obtained. In step S42, an average queue dwell time is determined. In step S43, the average queue dwell time is used for calculating the common delay parameter. In other words, the reference dwell time value is determined for each secondary node in dependence on the average queue dwell time and the time skew correction value.

Figure 3:
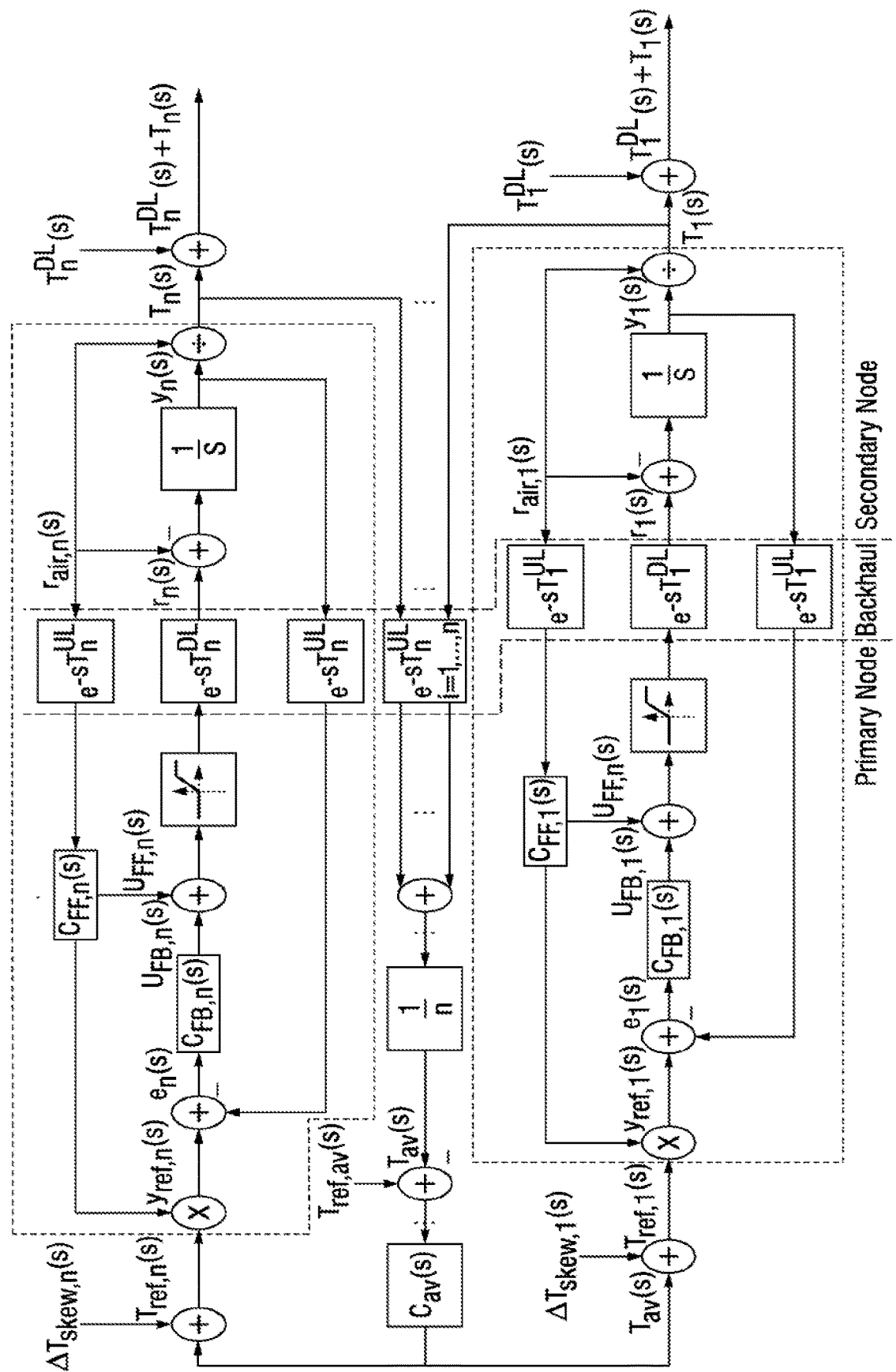
FIGS. 3-5 is a block diagrams describing embodiments of decentralized controller architectures in case of n nodes.

An embodiment of the new decentralized controller architecture is depicted in FIG. 3. One instance of the time skew flow controller is described. As can be seen in FIG. 3 the main ideas include only one feedback loop that introduces coupling—the average DL delay time T $a_v$(s) control loop. Single-input-single-output skew controllers—separately for each path, operates by reference value adjustment using $\Delta T_{skew,i}(s)$.

The components of FIG. 3 can be explained as follows.

$T_{av}(s)$ is the Laplace transform of the average dwell time of the transmit queues of the involved secondary nodes.

$T_{ref,av}(S)$ is the Laplace transform of the reference value for the average dwell time of the transmit queues of the involved secondary nodes. This set point allows regulation of the absolute latencies of the paths. An increased value can be used to increase the probability that data is available for transmission over all active links, thereby potentially avoiding dropped links in case of piggy backed control information in the ultra-lean transmission anticipated for 5G.

$C_{av}(s)$ is the transfer function of the average queue dwell time feedback controller filter. This controller filter is used to ensure that data is available for transmission over all links that are desired to stay active. This addresses the potential problem with data starvation in case of ultra-lean transmission.

$\Delta T_{skew,i}(s)$ is the Laplace transform of the time skew adjustment, made to adjust the reference value towards a setting that results in low time skew, i=1, ..., n.

$T_{ref,i}(s)$ is the Laplace transform of the resulting reference dwell time value for the secondary queue dwell time, i=1, ..., n.

$y_{ref,i}(s)$ is the Laplace transform of the queue data volume reference for the secondary queue data volume, i=1, ..., n.

$r_{air,i}(s)$ is the Laplace transform of the measured wireless air interface rate, i=1, ..., n.

$C_{FF,i}(s)$ is the Laplace transform of the feedforward controller filter, i=1, ..., n.

$e_i(s)$ is the Laplace transform of the feedback control error, i=1, ..., n.

$C_{FB,i}(s)$ is the Laplace transform of the feedback controller filter, i=1, ..., n.

$u_{FB,i}(s)$ is the Laplace transform of the feedback channel contribution, i=1, ..., n.

$u_{FF,i}(s)$ is the Laplace transform of the feedforward channel contribution, i=1, ..., n.

$T_i^{DL}$ is the downlink backhaul delay, i=1, ..., n.

$r_i(s)$ is the Laplace transform of the incoming data rate to the secondary node, i=1, ..., n.

$y_i(s)$ is the queue data volume of the transmit queue of the secondary node, i=1, ..., n.

$T_i(s)$ is the Laplace transform of the dwell time of the transmit queue of the secondary node, i=1, . . . , n.

$T_i^{UL}$ is the uplink backhaul latency, i=1, . . . , n.

To describe the proposed technology, it is noted that the secondary nodes are nodes that perform the wireless interface transmission and that get their transmit data from transmit queues, typically 1 queue for each "bearer", where a bearer may be thought of as an IP connection between the source and the end user. The reason why the secondary nodes need queues is that the radio channels are subject to rapid fading. Furthermore, the interface between the secondary nodes and the primary data source node, i.e. the backhaul interface, is subject to delay in both the downlink and the uplink. To ensure that the secondary nodes do not run out of data when there is data to transmit upstream, queues are needed for buffering purposes. The queues are typically designed to give a packet dwell time in the transmit queues of the order of the sum of the UL and DL backhaul delay.

Each queue in a secondary node is controlled by a separate controller, exploiting feedback from the queue data volume and feedforward from the measured air interface rate with the purpose of controlling the dwell time of the queue to follow a desired reference value. The separate controllers are marked with a respective point-and-line box. The air interface rate can also be referred to as wireless rate, interchangeably. In FIG. 3 the reference values for the controllers are $T_i^{ref}(s)$, i=1, . . . , n, while the controlled outputs are $T_i(s)$, i=1, . . . , n.

One characterizing feature of the proposed technology that cannot be found in prior art is that the time skew, i.e. the differences between the total downlink delay between the slave nodes (n in FIG. 3) are controlled by means of a reference value compensation $\Delta T_{skew,i}(s)$ individual for each queue. This dwell time reference value adjustment is selected to make the total downlink delay of downlink path to the UE equal, thereby solving the time skew control problem.

In one embodiment the reference value compensation is selected as:

$$\Delta T_{skew,i}(s) = T_{av}^{DL}(s) - T_i^{DL}, i = 1, \ldots, n \quad (1)$$

$$T_{av}^{DL}(s) = \frac{1}{n}\sum_{n=1}^{n} T_i^{DL}(s). \quad (2)$$

The reference value for the queue dwell time becomes:

$$T_{ref,i}(s) = C_{av}(s)(T_{ref,av}(s) - T_{av}(s)) + T_{av}^{DL}(s) - T_i^{DL}(s). \quad (3)$$

The total downlink delay follows as:

$$T_{ref,i}(s) + T_i^{DL} = C_{av}(s)(T_{ref,av}(s) - T_{av}(s)) + T_{av}^{DL}(s), \quad (4)$$

provided that the control loops are successful in achieving the reference values set for the dwell time. The key point is now that the total downlink delay is independent of the secondary node (indexed by i=1, . . . , n). Thus the total downlink delays over all secondary nodes become the same, which means that the time skew is close to zero between all secondary nodes. The time skew control problem is hence solved.

The solution of this embodiment may include:

Measuring backhaul downlink delay, also denoted downlink signaling delay, in each involved secondary node.

Measuring transmit queue delay, also denoted dwell time, in each involved secondary node and for each bearer.

Forming the average backhaul downlink delay in the primary node, for each bearer.

Forming the time skew adjustment in the master, i.e. primary, node, for each involved secondary node and for each bearer.

Another characterizing feature of an embodiment of the proposed technology relates to the use of the average dwell time of the transmit queues of the secondary nodes, as the basis for the generation of the reference dwell time value for each secondary node.

In one such an embodiment, the average dwell time of the secondary node transmit queues are steered towards a preset reference value. This reference value can e.g. be selected based on a priori knowledge of the latencies of the backhaul, typically a little larger than the maximum backhaul latency of the involved secondary nodes. What is essential in terms of the invention is that the average dwell time is steered by the controller $C_{av}(s)$, towards the reference value. This has the specific advantage that drift is avoided for the average dwell times, such drift could otherwise result in very long latencies or too short latencies, both alternatives deteriorating performance.

Another key advantage of the average delay control channel is that it contributes to ensure that paths/links are not dropped because of data starvation. Such a data starvation over a link means that ultra-lean piggy backed control channel and system information data would not be signaled. This could then result in loss of critical link information like wireless channel state information or synchronization that could lead to said path/link being dropped. One way to avoid this is to ensure that there is always some data going over all paths/links that are desired to be active. This is achieved by the invention via the setpoint value $T_{ref,av}(s)$ and the associated controller filter $C_{av}(s)$, giving the common delay parameter. This can e.g. be understood by considering the case with zero skew setpoints. In that case the sum of delay will become distributed along all paths/links so if the setpoint is high enough the downlink delay of all links will be larger than the backhaul delays of said links. That means that the transmit data queues will have to add a delay, something that may include a non-zero data volume in all transmit queues. Note that in 5G it will be increasingly important to keep multiple links active since very sudden drops of main links may occur to the very sharp radio shadowing that occur at high carrier frequencies.

Figure 4:
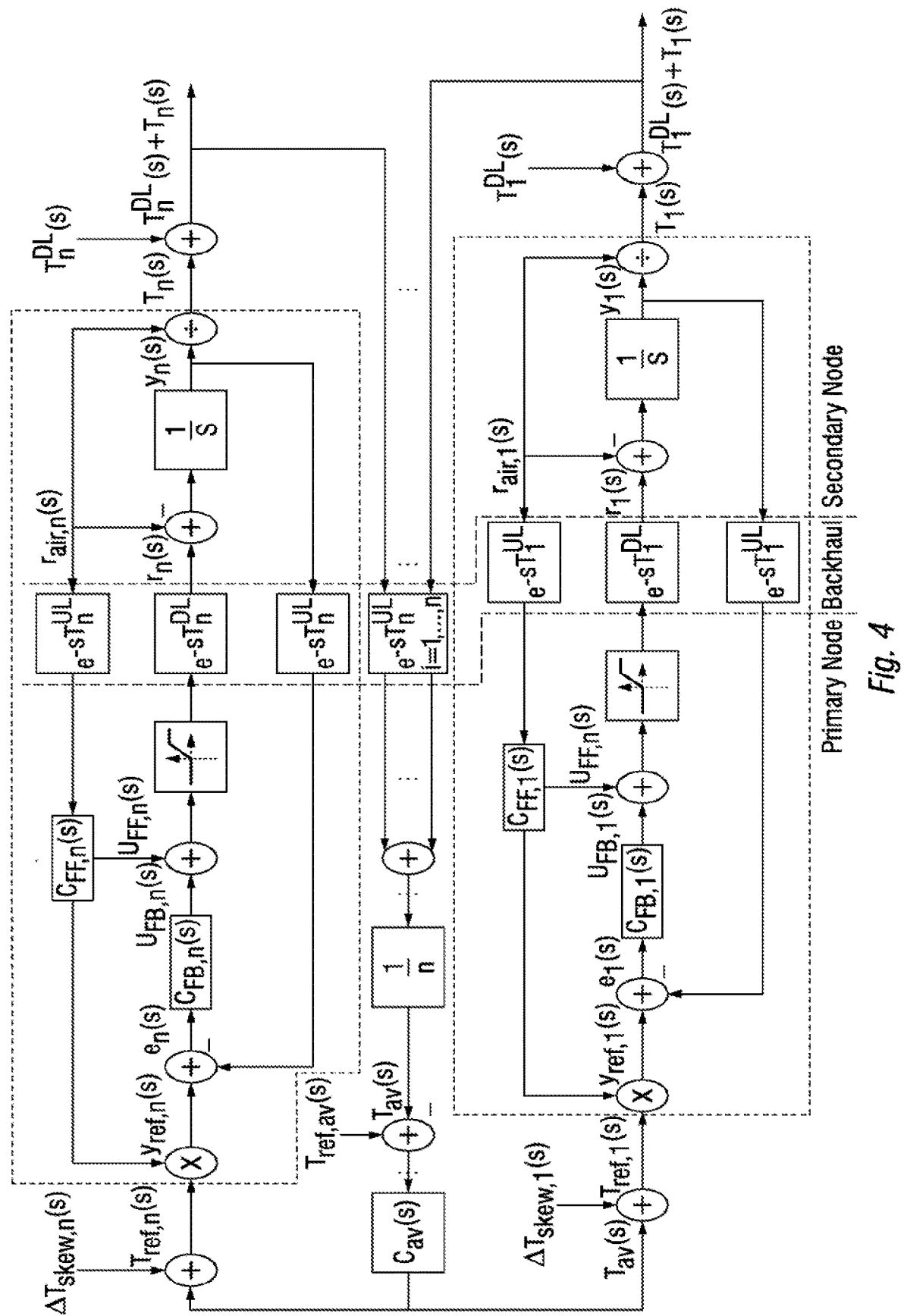

In another embodiment the average dwell time may be replaced by the average total downlink delay, including the backhaul delays. This is illustrated in FIG. 4. The common delay parameter is then preferably based on a setpoint value $T_{ref,av}(s)$, which now concerns the total downlink delay and the associated controller filter $C_{av}(s)$.

Figure 5:
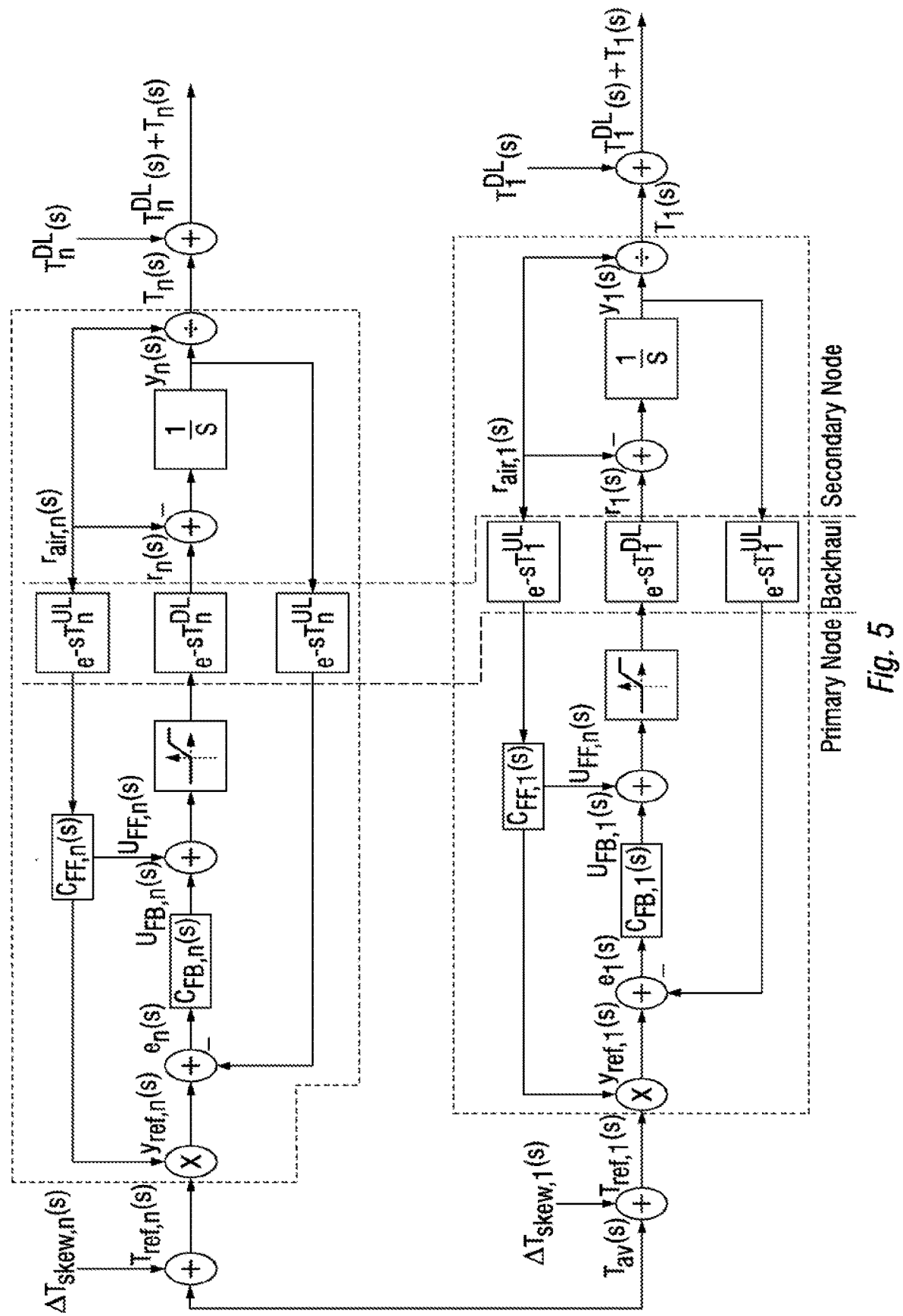

In yet another embodiment, the common delay parameter could be a fixed value associated with some general average dwell time. This fixed parameter could be used, directly affecting the reference value for each secondary node dwell time. The average dwell time feedback path and signals are removed, as shown in FIG. 5, in this embodiment, meaning that the dwell time controllers of all secondary nodes are perfectly decoupled.

Another feature of the proposed technology comprises the measuring of downlink signaling delay between a primary node and the secondary node and signaling of the measured downlink signaling delay from each secondary node to the primary skew controlling node. In embodiments utilizing dwell times, also measuring of dwell times are performed and signaling of the measure dwell times from each secondary node to the primary skew controlling node. This signaling will require new messages. These new messages will contain information elements, comprising at least:
- a secondary node identity (number)
- a bearer identity (number) and
- a downlink signaling delay information element and in certain embodiments also:
- a queue dwell time information element.

Optionally, a time tag, for measuring also the uplink delay may be included. This may be useful for controller design purposes.

Figure 10:
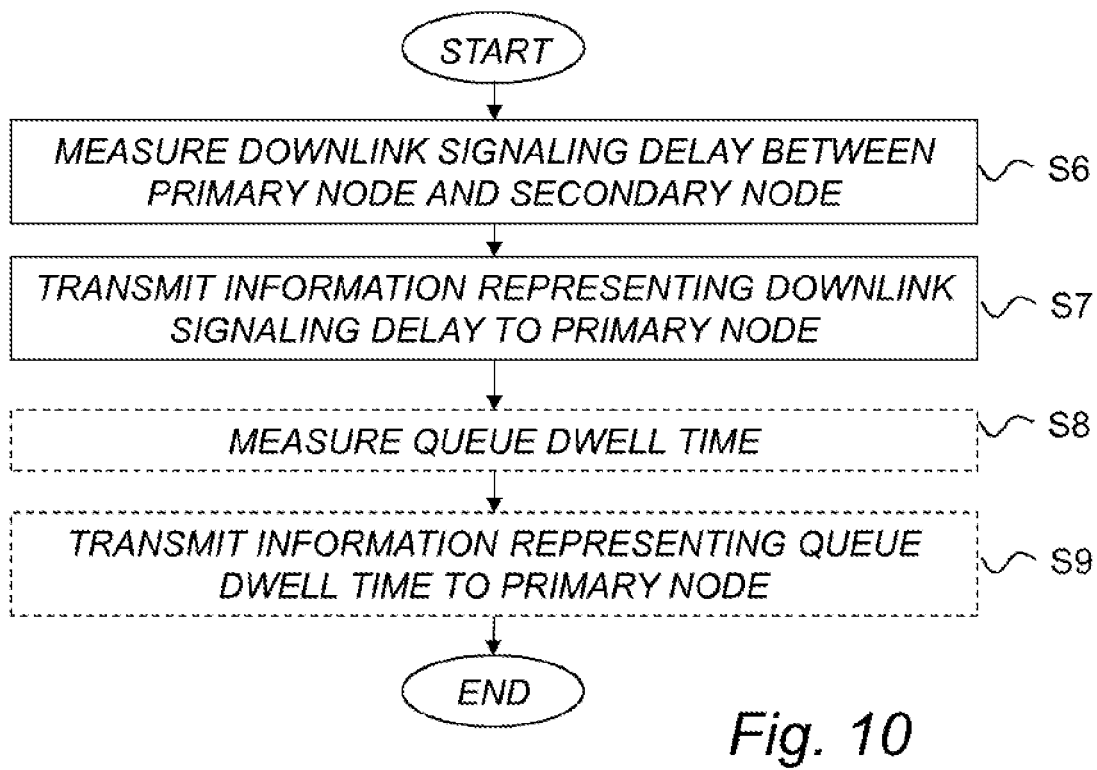
FIGS. 7-10 are flow diagrams of steps of embodiments of methods associated with multi-point transmission control.

FIG. 10 is a flow diagram of steps of an embodiment of a method for assisting in multi-point transmission control implemented in a secondary node. In step S6 downlink signaling delay between a primary node and the secondary node is measured. In step S7 information representing the downlink signaling delay is transmitted to the primary node. In step S8 the queue dwell time in the secondary node may be measured and in step S9 information representing the queue dwell time may be transmitted to the primary node. Further a time tag for measuring uplink delay may also be transmitted to the primary node.

The above described steps of the method may be performed regularly for example with constant sampling periods. In addition sudden changes may also trigger feedback information from the secondary nodes, although this is not a preferred embodiment. The feedback information representing downlink signaling delays obtained from the secondary nodes is preferably periodic. Thereby no messages have to be transmitted from the primary node to the secondary nodes in order to trigger the feedback. Further, this causes the method to continuously react and regulate away timing variations The downlink time tagging that may be used as a part of the measurement of the downlink backhaul delay, also referred to as downlink signaling delay is available in prior art.

The proposed technology outlines new techniques to regulate the transmit queue levels of multiple transmit points served by secondary nodes, so that the timing skews between transmit paths experienced in the UE are all within pre-specified limits. In a preferred embodiment the regulation is performed per bearer. In another embodiment aggregates of bearers may be used. In the proposed technology it is assumed that the controller that performs data splitting and time skew control resides in a primary node. The division of functionality between the primary node, and the secondary interface is depicted in FIGS. 3-5.

A special feature of the proposed technology is that it is formulated for an arbitrary number (n) of secondary transmit nodes.

A special feature of the proposed technology is that secondary inter-node coupling is minimized. Instead reference value setting is employed. The effect would be to simplify the controller design and the computational complexity, by design of each single path loop in an independent manner.

The 5G problem associated with ultra-lean transmission is also solved by the proposed technology, since one of the degrees of freedom of the proposed skew controller allows control of the average absolute delay of all active paths. An increase of the set point for this controlled quantity will ensure that data is available for transmission over all multi-path links with high enough probability.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to obtain information representing downlink signaling delays between the primary node and secondary nodes, to determine an average downlink signaling delay between the primary node and the secondary nodes, to determine a respective time skew correction value for each secondary node by subtracting a respective downlink signaling delay from the average downlink signaling delay, and, to determine a respective reference dwell time value for each secondary node as a sum of the time skew correction value and a common delay parameter.

According to an aspect of the proposed technology there is provided an arrangement configured to obtain information representing downlink signaling delays between the primary node and secondary nodes, to determine an average downlink signaling delay between the primary node and the secondary nodes, to determine a respective time skew correction value for each secondary node by subtracting a respective downlink signaling delay from the average downlink signaling delay, to determine a respective reference dwell time value for each secondary node as a sum of the time skew correction value and a common delay parameter, and to control the queue dwell time for each secondary node in dependence of the reference dwell time value.

According to an aspect of the proposed technology there is provided an arrangement configured to measure downlink signaling delay between a primary node and the secondary node, and to transmit information representing the downlink signaling delay to the primary node.

Figure 11:
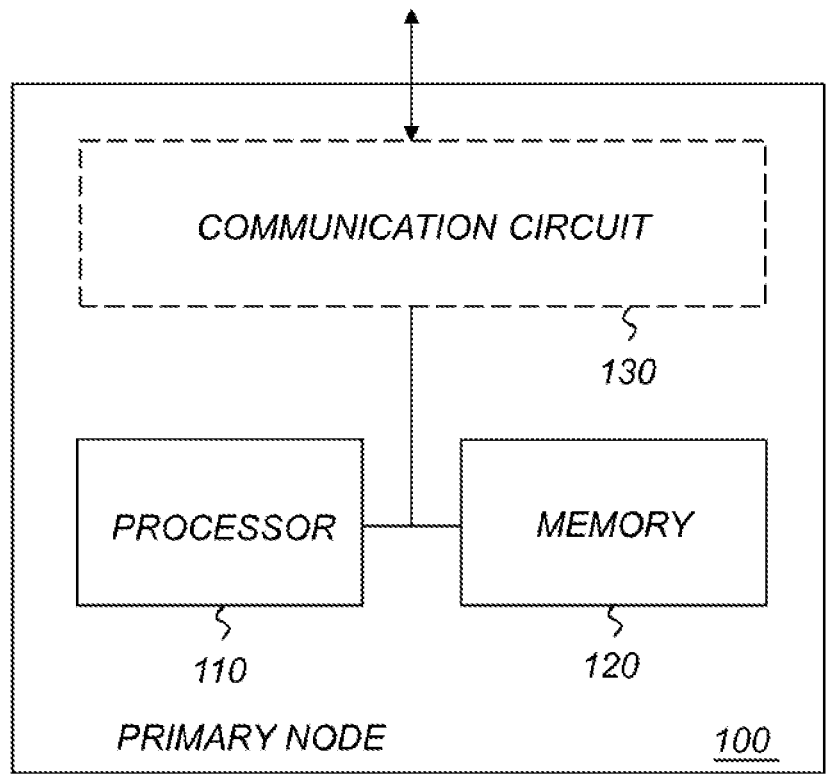
FIGS. 11-22 are illustrations of embodiments of nodes in a system employing multi-point transmission.

FIG. 11 is a schematic block diagram illustrating an example of a primary node 100, based on a processor-memory implementation according to an embodiment. In this particular example, the primary node 100 comprises a processor 110 and a memory 120, the memory 120 comprising instructions executable by the processor 110, whereby the processor is operative to obtain information representing downlink signaling delays between the primary node and secondary nodes, to determine an average downlink signaling delay between the primary node and the secondary nodes, to determine a respective time skew correction value for each secondary node by subtracting a respective downlink signaling delay from the average downlink signaling delay, and to determine a respective reference dwell time value for each secondary node as a sum of the time skew correction value and a common delay parameter. In a particular embodiment, the processor is further operative to control the queue dwell time for each secondary node in dependence of the reference dwell time value.

Optionally, the primary node 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

Figure 12:
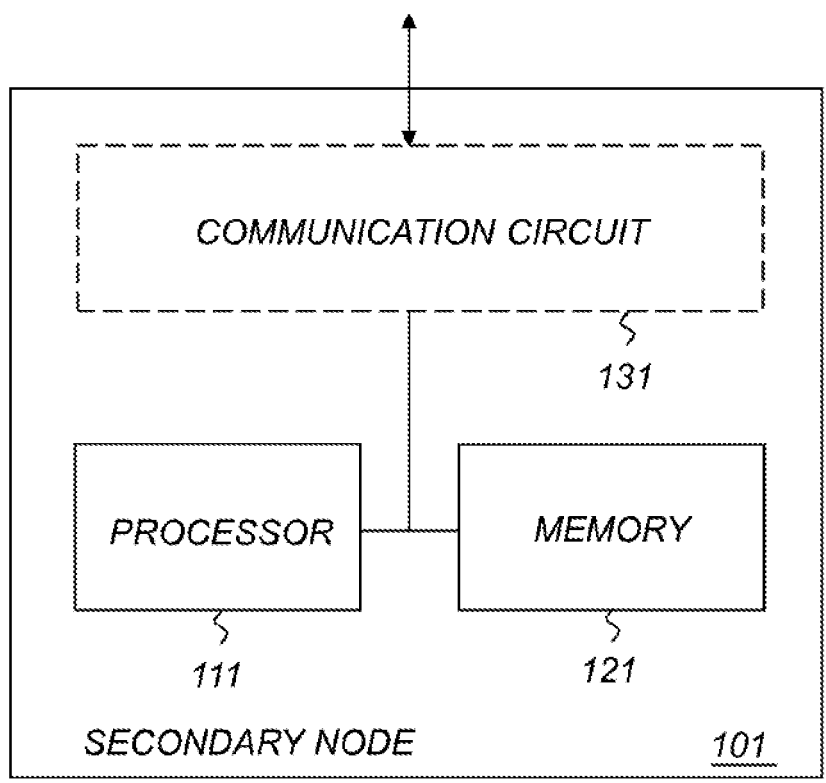

FIG. 12 is a schematic block diagram illustrating an example of a secondary node 101, based on a processor-memory implementation according to an embodiment. In this particular example, the secondary node 101 comprises a processor 111 and a memory 121, the memory 121 comprising instructions executable by the processor 111, whereby the processor is operative to measure downlink signaling delay between a primary node and the secondary node, and to transmit information representing the downlink signaling delay to the primary node.

Optionally, the secondary node 101 may also include a communication circuit 131. The communication circuit 131 may include functions for wired and/or wireless communication with other devices and/or network nodes in the network. In a particular example, the communication circuit 131 may be based on radio circuitry for communication with one or more other nodes, including transmitting and/or receiving information. The communication circuit 131 may be interconnected to the processor 111 and/or memory 121. By way of example, the communication circuit 131 may include any of the following: a receiver, a transmitter, a transceiver, input/output (I/O) circuitry, input port(s) and/or output port(s).

Figure 13:
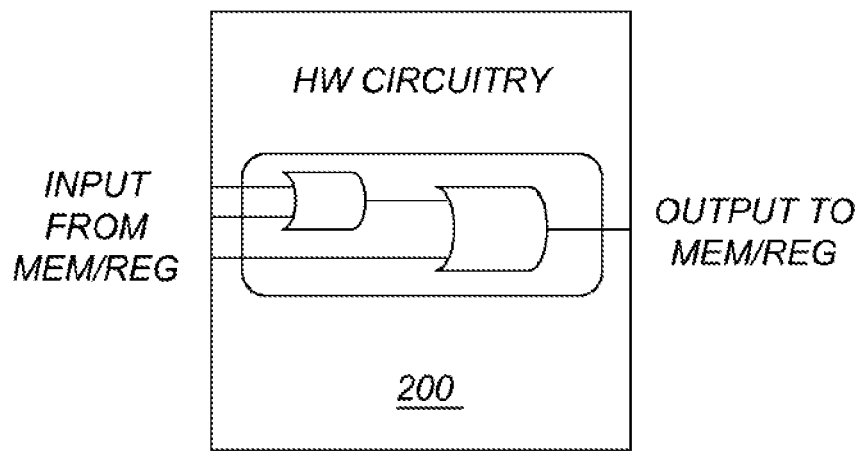

FIG. 13 is a schematic block diagram illustrating another example of a primary node 200, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 14:
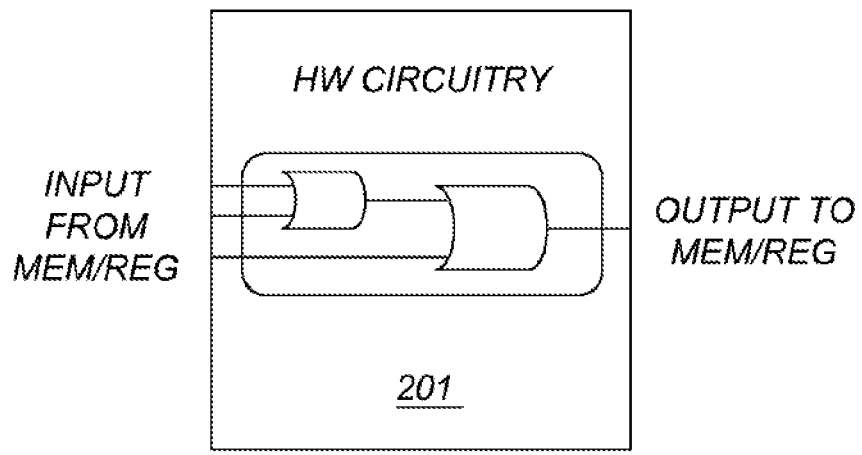

FIG. 14 is a schematic block diagram illustrating another example of a secondary node 201, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 15:
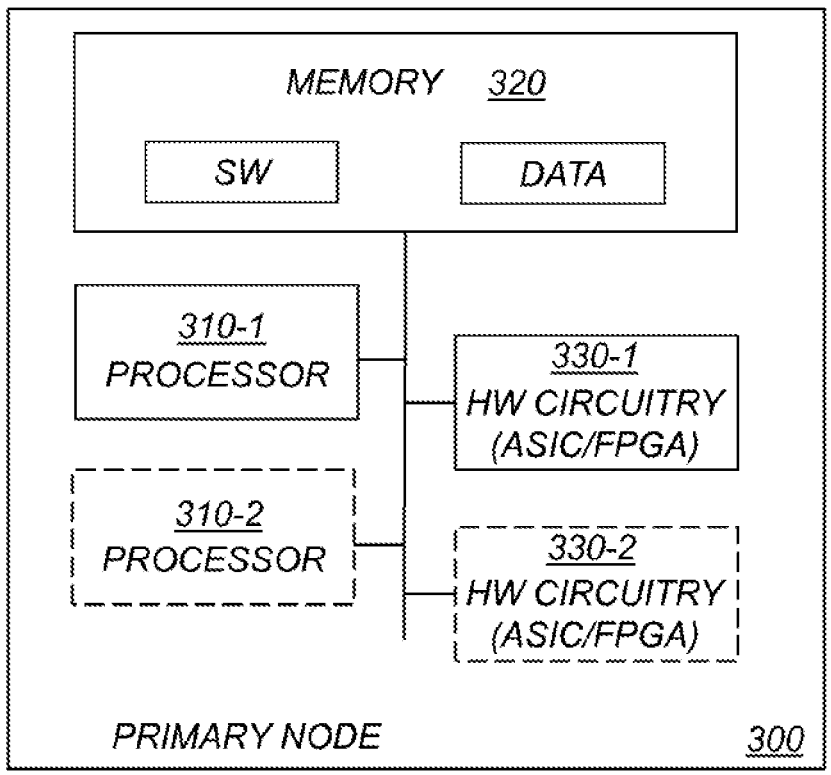

FIG. 15 is a schematic block diagram illustrating yet another example of a primary node 300, based on combination of both processor(s) 310-1, 310-2 and hardware circuitry 330-1, 330-2 in connection with suitable memory unit(s) 320. The primary node 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Figure 16:
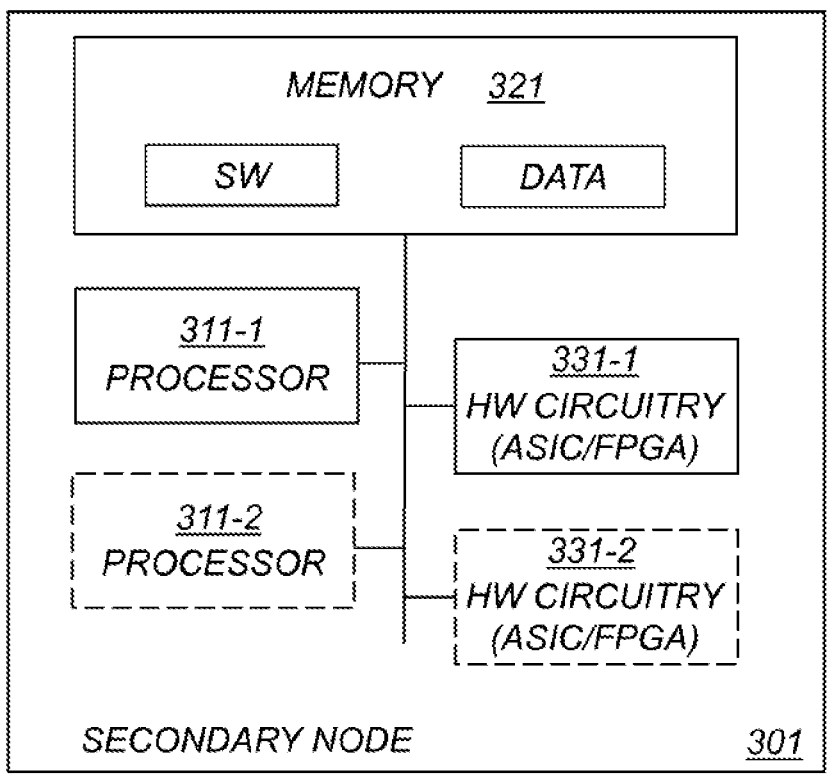

FIG. 16 is a schematic block diagram illustrating yet another example of a secondary node 301, based on combination of both processor(s) 311-1, 311-2 and hardware circuitry 331-1, 331-2 in connection with suitable memory unit(s) 321. The secondary node 301 comprises one or more processors 311-1, 311-2, memory 321 including storage for software and data, and one or more units of hardware circuitry 331-1, 331-2 such as ASICs and/or FPGAs. The overall functionality is thus partitioned between programmed software (SW) for execution on one or more processors 311-1, 311-2, and one or more pre-configured or possibly reconfigurable hardware circuits 331-1, 331-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 17:
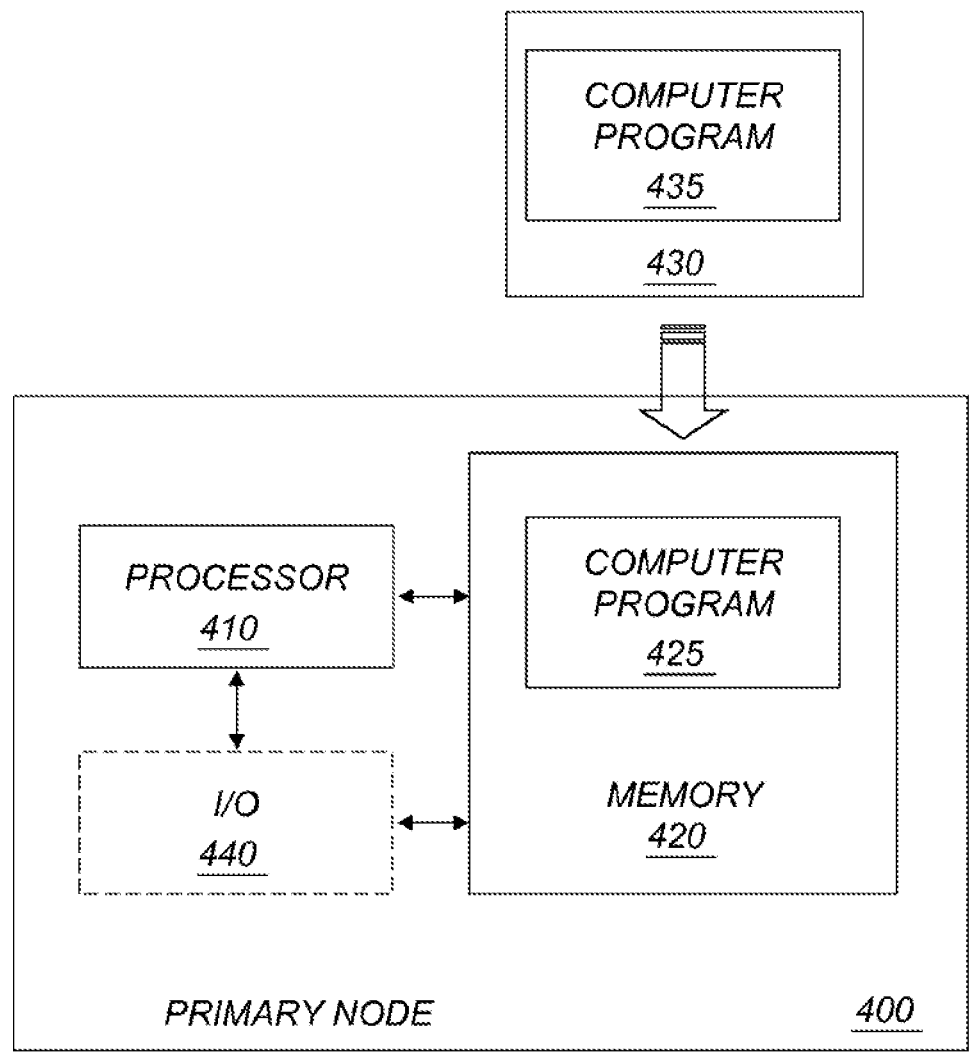

FIG. 17 is a schematic diagram illustrating an example of a computer-implementation of a primary node 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The processing circuitry including one or more processors 410 is thus configured to perform, when executing the computer program 425, well-defined processing tasks such as those described herein.

In a particular embodiment, the computer program 425; 435 comprises instructions, which when executed by at least one processor 410, cause the processor(s) 410 to obtain information representing downlink signaling delays between the primary node and secondary nodes, to determine an average downlink signaling delay between the primary node and the secondary nodes, to determine a respective time skew correction value for each secondary node by subtracting a respective downlink signaling delay from the average downlink signaling delay, and to determine a respective reference dwell time value for each secondary node as a sum of the time skew correction value and a common delay parameter. In a particular embodiment the computer program 425; 435 comprises further instructions, which when executed by at least one processor 410, cause the processor(s) 410 to control the queue dwell time for each secondary node in dependence of the reference dwell time value.

Figure 18:
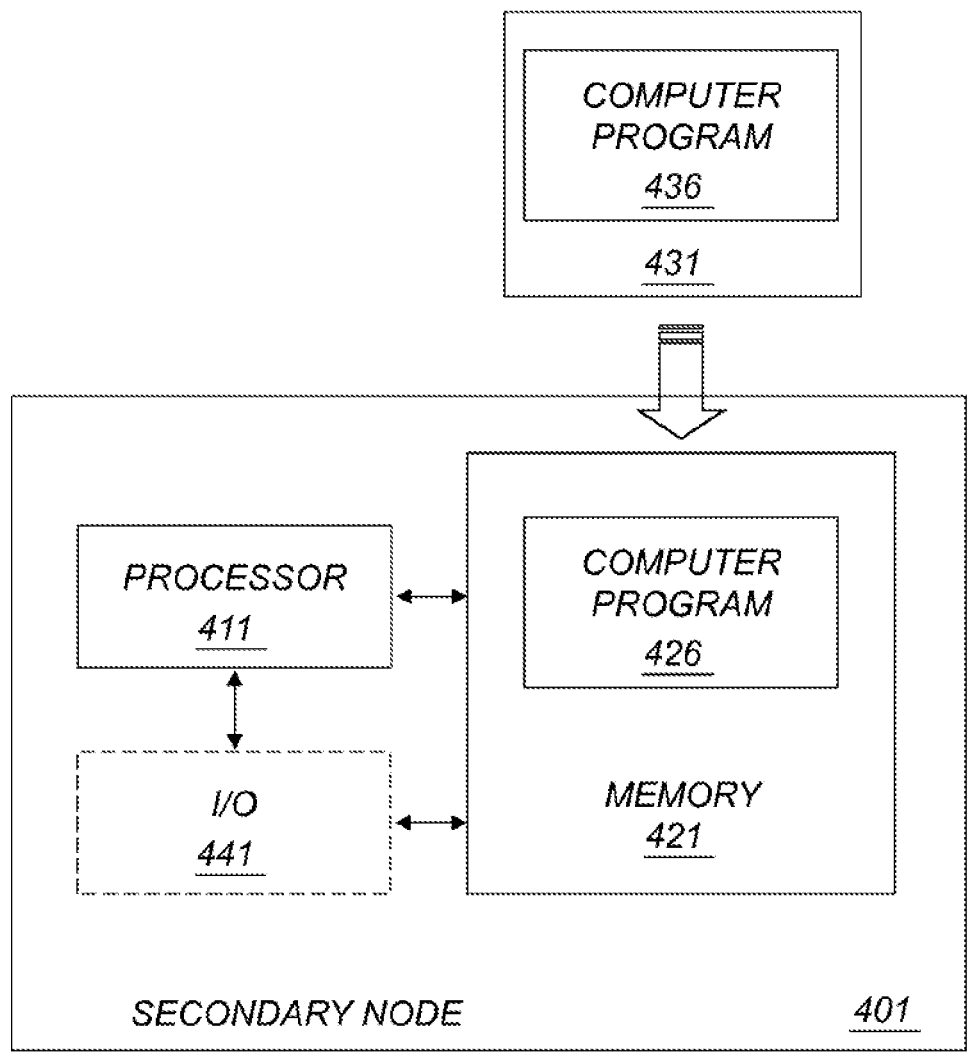

FIG. 18 is a schematic diagram illustrating an example of a computer-implementation of a secondary node 401 according to an embodiment. In this particular example, at least some of the steps, functions, procedures, modules and/or blocks described herein are implemented in a computer program 426; 436, which is loaded into the memory 421 for execution by processing circuitry including one or more processors 411. The processor(s) 411 and memory 421 are interconnected to each other to enable normal software execution. An optional input/output device 441 may also be interconnected to the processor(s) 411 and/or the memory 421 to enable input and/or output of relevant data such as input parameter(s) and/or resulting output parameter(s).

The processing circuitry including one or more processors 411 is thus configured to perform, when executing the computer program 426, well-defined processing tasks such as those described herein.

In a particular embodiment, the computer program 426; 436 comprises instructions, which when executed by at least one processor 411, cause the processor(s) 411 to measure downlink signaling delay between a primary node and the secondary node, and to transmit information representing the downlink signaling delay to the primary node.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 426; 435; 436 may be realized as a computer program product, which is normally carried or stored on a computer-readable medium 420; 421; 430; 431, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 19:
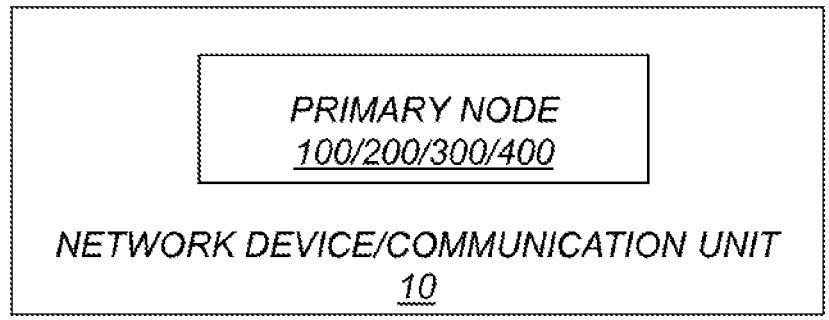

FIG. 19 is a schematic block diagram illustrating an example of a network device comprising a primary node 100; 200; 300; 400 according to any of the embodiments above.

According to an aspect, there is provided a network device/communication unit 10 comprising a primary node 100; 200; 300; 400 as described herein.

According to another aspect, there is provided a communication unit 10 in a wireless communication system, wherein the communication unit 10 comprises a primary node 100; 200; 300; 400 as described herein. The communication unit may be any suitable communication unit in the wireless communication system. By way of example, the communication unit may be a wireless communication device such as a UE, STA or similar end-user device.

Figure 20:
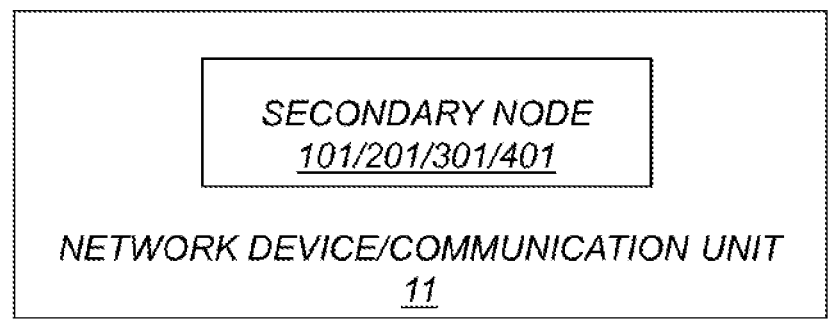

FIG. 20 is a schematic block diagram illustrating an example of a network device 11 comprising a secondary node 101; 201; 301; 401 according to any of the embodiments above.

According to an aspect, there is provided a network device/communication unit 10 comprising a secondary node 101; 201; 301; 401 as described herein.

According to another aspect, there is provided a communication unit 11 in a wireless communication system, wherein the communication unit 10 comprises a secondary node 101; 201; 301; 401 as described herein. The communication unit may be any suitable communication unit in the wireless communication system. By way of example, the communication unit may be a wireless communication device such as a UE, STA or similar end-user device.

The network device 10; 11 may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 21:
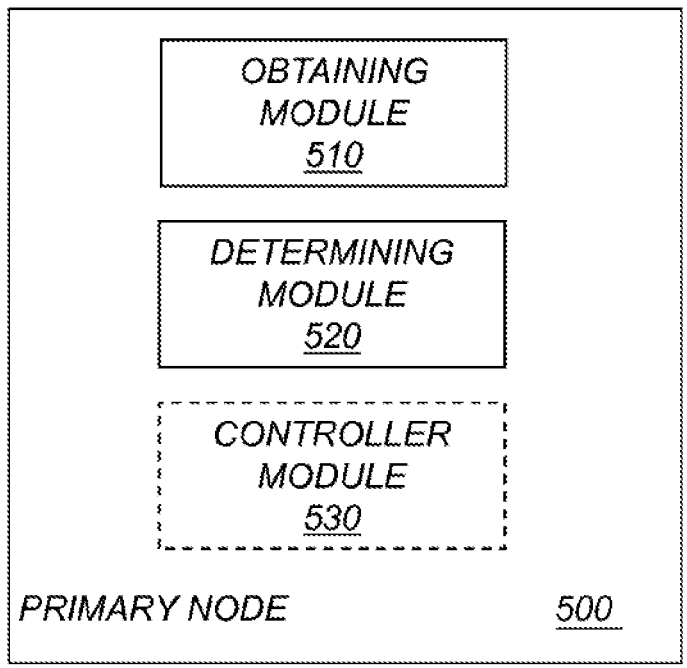

FIG. 21 is a schematic diagram illustrating an example of a primary node 500 for assisting in controlling of multi-point transmission comprises an obtaining module 510 for obtaining information representing downlink signaling delays between the primary node and secondary nodes. The primary node 500 further comprises a determining module 520 for determining an average downlink signaling delay between the primary node and the secondary nodes and for determining a respective time skew correction value for each secondary node by subtracting a respective downlink signaling delay from the average downlink signaling delay, and for determining a respective reference dwell time value for each secondary node as a sum of the time skew correction value and a common delay parameter. In a primary node 500 for controlling of multi-point transmission, the primary node 500 further comprises a controller module 530 for controlling the queue dwell time for each secondary node in dependence of the reference dwell time value.

Figure 22:
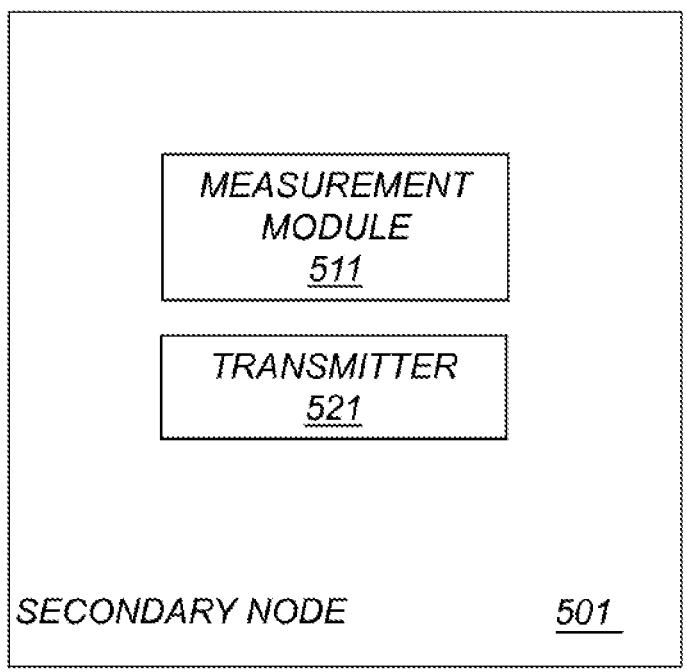

FIG. 22 is a schematic diagram illustrating an example of a secondary node 501 for assisting in controlling of multi-point transmission comprises a measurement module 511 for measuring downlink signaling delay between a primary node and the secondary node and a transmitter 521 for transmitting information representing the downlink signaling delay to the primary node.

Alternatively it is possible to realize the module(s) in FIGS. 21-22 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 23:
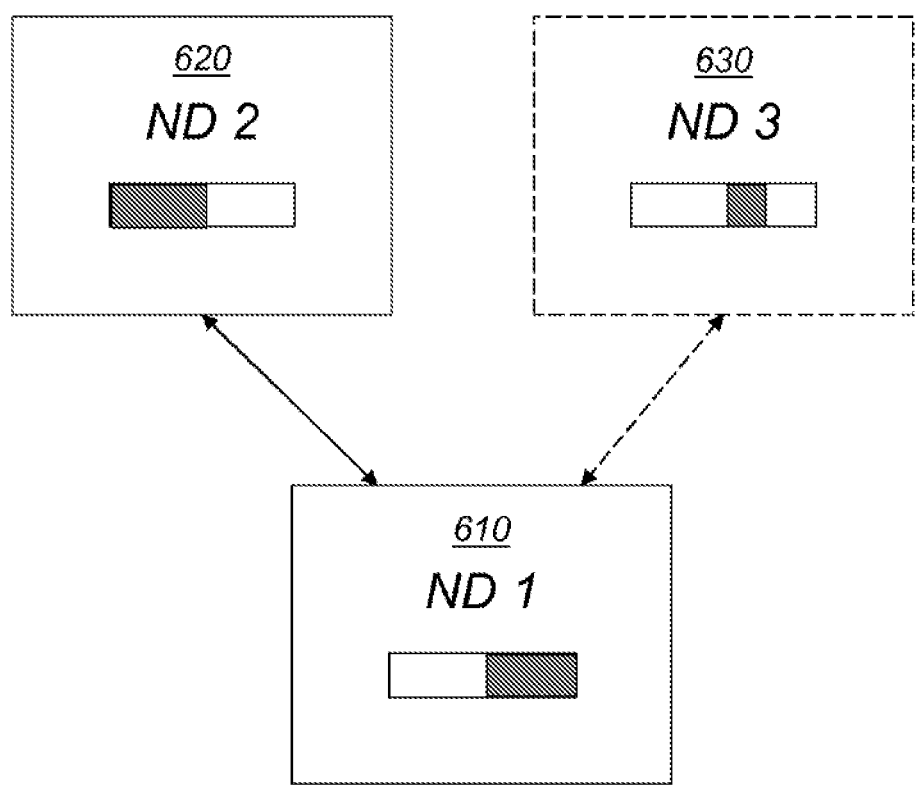
FIG. 23 is a schematic diagram illustrating an example of general functionality distribution or partition.

FIG. 23 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 24:
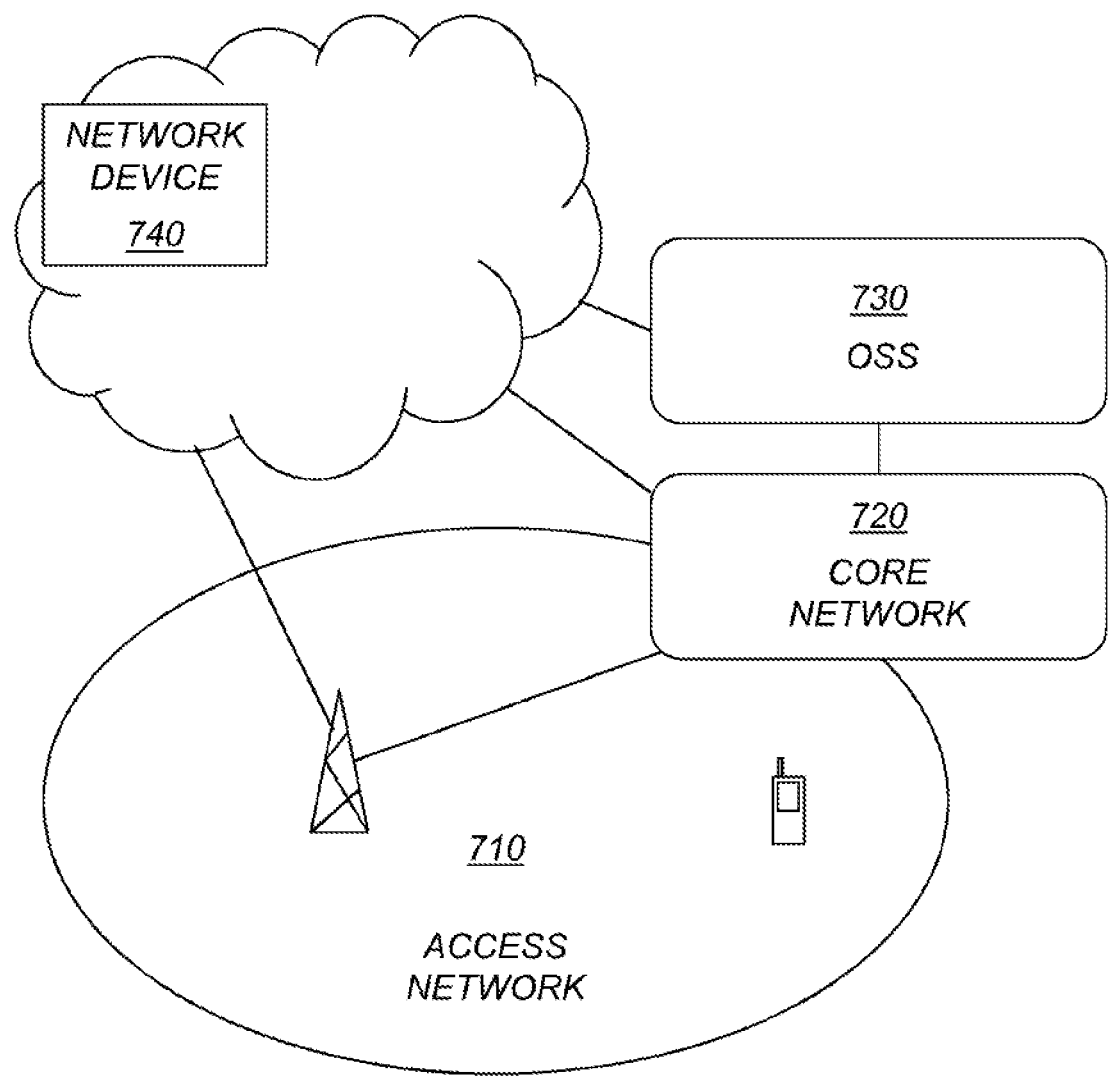
FIG. 24 is a schematic diagram illustrating an example of a wireless communication system.

FIG. 24 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof. A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

Automatic Control Terminology

As a start, a number of representations of a dynamic process need to be introduced. A dynamic process is one where the output depends not only on the present input signal but also of previous inputs and outputs. Put otherwise, the dynamic process has memory. The most basic dynamic process is the linear one that can be described by a differential equation as:

$$y^{(n)}(t)+a_1y^{(n-1)}(t)+\ldots+a_ny(t)=b_0u^{(m)}(t)+\ldots+b_mu(t). \quad (A1)$$

Here y(t) is the output signal, u(t) is the input signal, t is the time, while $a_i$ i=1 . . . n and $b_j$ j=0, . . . , m are constant parameters. (i) denotes differentiation with respect to time i times. The above differential equation has order n. It has one input signal and one output signal. For simplicity all concepts are explained in this context, but the generalization to more than one input signal and more than one input signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0s^m+b_1s^{m-1}+\ldots+b_m}{s^n+a_1s^{n-1}+\ldots+a_n}. \quad (A2)$$

The relation between the output signal and input signal Laplace transforms Y(s) and U(s) are:

$$Y(s)=H(s)U(s). \quad (A3)$$

The poles $p_i$ i=1, . . . , n of the process are given by the equation A(s)=0. For simplicity only strictly stable (open loop) processes with all poles in the left complex half plane is considered here. In general poles are real or complex conjugate pairs.

The properties of the dynamic process can also be studied in the frequency domain in terms of complex valued frequency functions Y(jω), H(jω) and U(jω). ω denotes the angular frequency that fulfils:

$$\omega=2\pi f, \quad (A4)$$

where f is the frequency in Hz. Below, frequency is used for angular frequency.

Figure 2:
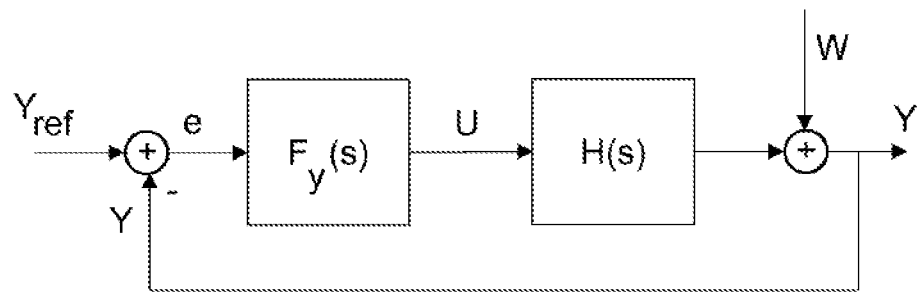
FIG. 2 illustrates a concept of feedback.

Finally, the concept of feedback is illustrated by FIG. 2, where $F_y(s)$ is the feedback gain. The closed loop system is then computed as follows:

$$Y(s)=W(s)+H(s)F_y(s)(Y_{ref}(s)-Y(s)) \quad (A5)$$

which gives:

$$Y(s) = \frac{F_y(s)H(s)}{1+F_y(s)H(s)}Y_{ref}(s) + \frac{1}{1+F_y(s)H(s)}W(s). \quad (A6)$$

This gives the effect of the reference signal and the disturbance on the output.

e denotes control error.

The remaining definitions now follow as:

The closed loop bandwidth $\omega_{CL}$ of the control system is given by the equation:

$$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2. \quad (A7)$$

The closed loop static error of the control system is given by the equation:

$$y_{ref} - y = \frac{1}{1+F_y(0)H(0)}(y_{ref} - w). \quad (A8)$$

The static disturbance rejection of the control system is given by the static sensitivity function:

$$S(0) = \frac{1}{1+F_y(0)H(0)}. \quad (A9)$$

The dynamic disturbance rejection of the control system is determined by the sensitivity function:

$$S(j\omega) = \frac{1}{1+F_y(j\omega)H(j\omega)}. \quad (A10)$$

The complimentary sensitivity function of the control system, T(jω)=1−S(hω) determines the robustness of the control system with respect to un-modelled dynamics.

Abbreviations

ASIC Application Specific Integrated Circuits
BTS Base Transceiver Stations
CD Compact Disc
COTS Common Off-The-Shelf
CPE Customer Premises Equipment
CPU Central Processing Units
DSP Digital Signal Processors
DVD Digital Versatile Disc
eNB evolved Node B
FPGA Field Programmable Gate Arrays
HDD Hard Disk Drive
HW hardware
I/O input/output
LEE Laptop Embedded Equipment
LME Laptop Mounted Equipment
MEM memory units
ND Network Device
NFV Network Function Virtualization
NI Network Interfaces
NIC Network Interface Controller
OS Operating System
OSS Operations and Support System
PC Personal Computer
PDA Personal Digital Assistant
PLC Programmable Logic Controllers
RAM Random Access Memory
REG registers
ROM Read-Only Memory
RRU Remote Radio Units
STA Station
SW software
UE User Equipment
USB Universal Serial Bus
VM Virtual Machine
VMM Virtual Machine Monitor
VNE Virtual Network Element
WNIC Wireless Network Interface Controller

The invention claimed is:

1. A method, in a primary node, for assisting in multi-point transmission control, the method comprising:

obtaining information representing downlink signaling delays between the primary node and secondary nodes;

determining an average downlink signaling delay between the primary node and the secondary nodes;

determining a respective time skew correction value for each secondary node by subtracting a respective downlink signaling delay from the average downlink signaling delay; and determining a respective reference dwell time value for each secondary node as a sum of the time skew correction value and a common delay parameter.

2. The method of claim 1, further comprising controlling a queue dwell time for each secondary node based on the reference dwell time value.

3. The method of claim 1, wherein the determining a respective reference dwell time value comprises:

obtaining information representing queue dwell times for each of the secondary nodes;

determining an average queue dwell time; and determining the common delay parameter based on the average queue dwell time.

4. The method of claim 1, wherein the determining a respective reference dwell time value comprises setting the common delay parameter to be a fixed value.

5. The method of claim 1, wherein the determining a respective reference dwell time value comprises determining the common delay parameter based on the average downlink signaling delay.

6. The method of claim 2, wherein the obtaining, the determining the average downlink signaling delay, the determining the respective time skew correction value for each secondary node, the determining the respective reference dwell time value for each secondary node, and the controlling the queue dwell time are performed regularly.

7. A primary node in a multi-point transmission network configured to assist in multi-point transmission control, the primary node comprising:

processing circuitry;

memory containing instructions executable by the processing circuitry whereby the primary node is operative to:

obtain information representing downlink signaling delays between the primary node and secondary nodes;

determine an average downlink signaling delay between the primary node and the secondary nodes;

determine a respective time skew correction value for each secondary node by subtracting a respective downlink signaling delay from the average downlink signaling delay; and determine a respective reference dwell time value for each secondary node as a sum of the time skew correction value and a common delay parameter.

8. The primary node of claim 7, wherein the instructions are such that the primary node is operative to control a queue dwell time for each secondary node based on the reference dwell time value.

9. The primary node of claim 7, wherein the instructions are such that the primary node is operative to determine the respective reference dwell time value by:

obtaining information representing queue dwell times for each of the secondary nodes;

determining an average queue dwell time; and determining the common delay parameter based on the average queue dwell time.

10. The primary node of claim 7, wherein the instructions are such that the primary node is operative to determine the respective reference dwell time value by setting the common delay parameter to be a fixed value.

11. The primary node of claim 7, wherein the instructions are such that the primary node is operative to determine the respective reference dwell time value by determining the common delay parameter based on the average downlink signaling delay.

12. The primary node of claim 8, wherein the instructions are such that the primary node is operative to regularly perform: the obtaining, the determining the average downlink signaling delay, the determining the respective time skew correction value for each secondary node; the determining the respective reference dwell time value for each secondary node, and the controlling the queue dwell time for each secondary node.

13. A non-transitory computer readable recording medium storing a computer program product for assisting in multi-point transmission control, the computer program product comprising software instructions which, when run on processing circuitry of a primary node, causes the primary node to:

obtain information representing downlink signaling delays between the primary node and secondary nodes;

determine an average downlink signaling delay between the primary node and the secondary nodes;

determine a respective time skew correction value for each secondary node by subtracting a respective downlink signaling delay from the average downlink signaling delay; and determine a respective reference dwell time value for each secondary node as a sum of the time skew correction value and a common delay parameter.

* * * * *